March 15, 1927.

F. W. PETERS 1,621,215

UNIVERSAL JOINT

Filed Dec. 10, 1923

4 Sheets-Sheet 1

Inventor
Frederick W. Peters,
By Hull, Brock & West
Attys.

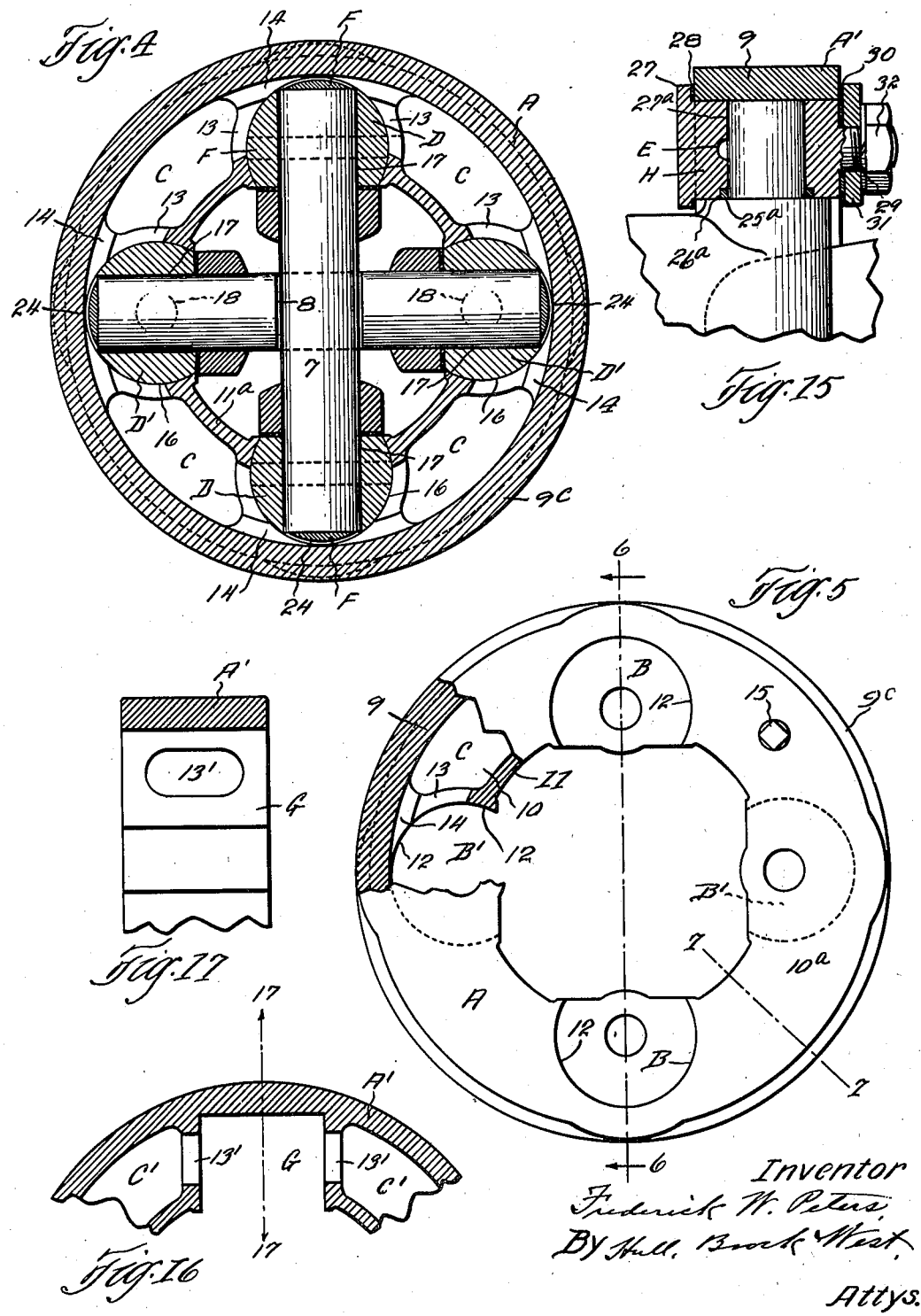

March 15, 1927. 1,621,215
F. W. PETERS
UNIVERSAL JOINT
Filed Dec. 10, 1923    4 Sheets-Sheet 3
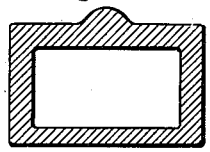
Fig. 7
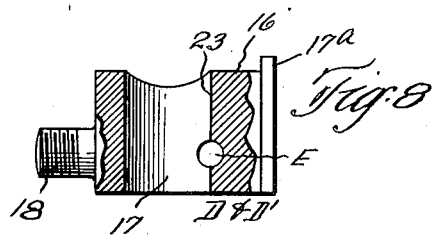
Fig. 8
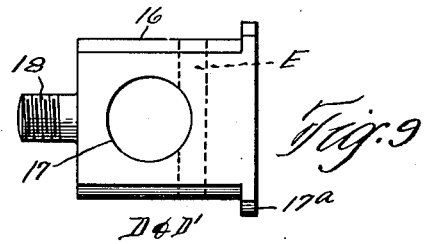
Fig. 9
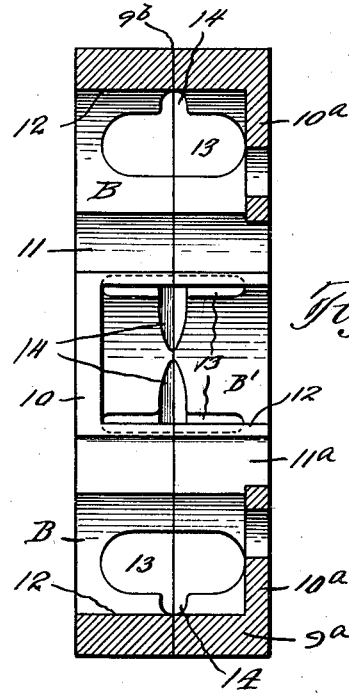
Fig. 6
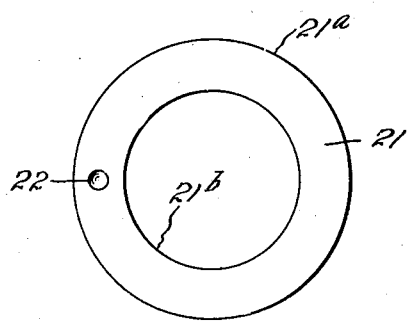
Fig. 11
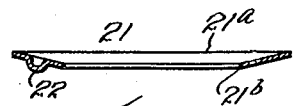
Fig. 12
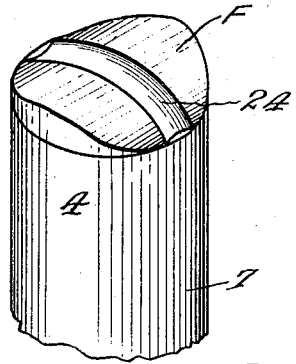
Fig. 10
Inventor
Frederick W. Peters
By Still, Brock & West
Attys.

March 15, 1927.
F. W. PETERS
UNIVERSAL JOINT
Filed Dec. 10, 1923     4 Sheets-Sheet 4
1,621,215
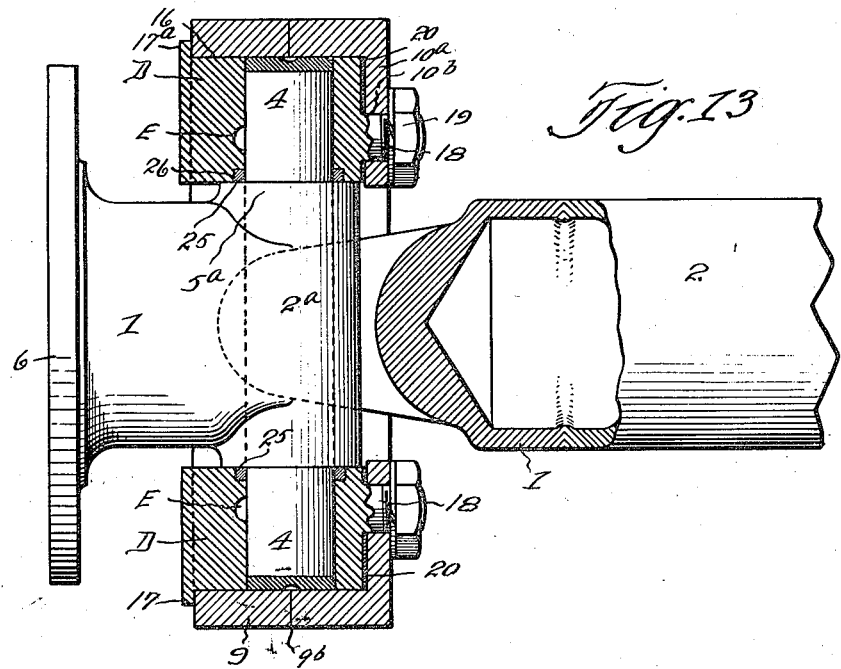
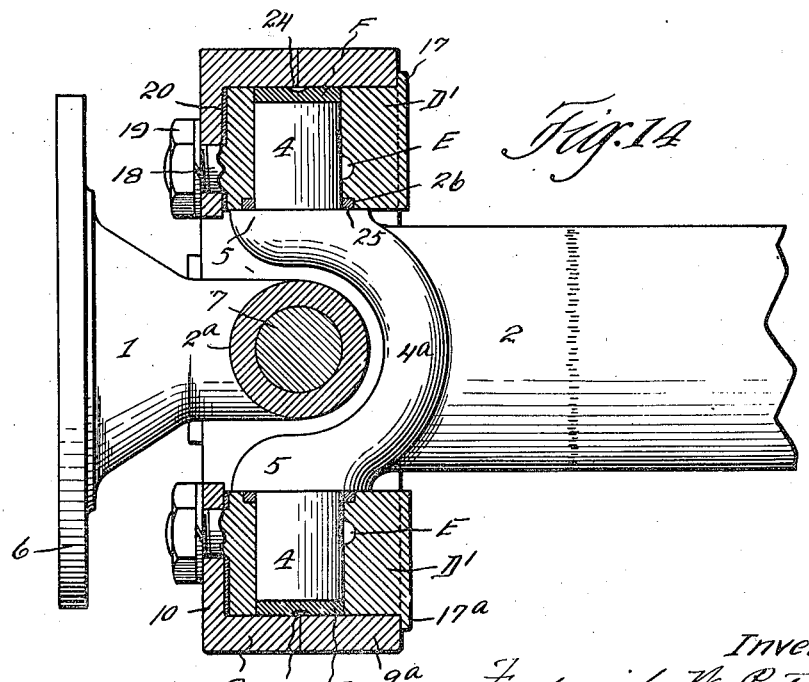
Inventor
Frederick W. Peters,
By Hull, Brock & West,
Attys.

Patented Mar. 15, 1927.

1,621,215

UNITED STATES PATENT OFFICE.

FREDERICK W. PETERS, OF CLEVELAND, OHIO, ASSIGNOR TO SPICER MANUFACTURING CORPORATION, OF SOUTH PLAINFIELD, NEW JERSEY, A CORPORATION OF VIRGINIA.

UNIVERSAL JOINT.

Application filed December 10, 1923. Serial No. 679,596.

This invention relates to universal joints, and has for its general object to provide a joint which may be conveniently and economically manufactured; which may be readily and conveniently assembled and disassembled; which will insure efficient lubrication between the trunnions and the bearings; and one which will be capable of withstanding the incidents of use. Further and more limited objects of the invention will appear in the specification and will be realized in and through the combination of elements set forth in the claims.

Figure 1:
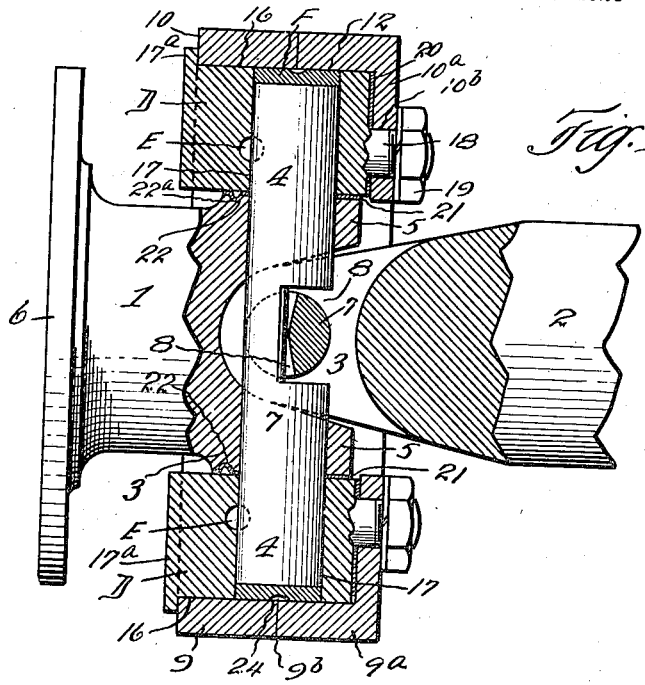
Figure 2:
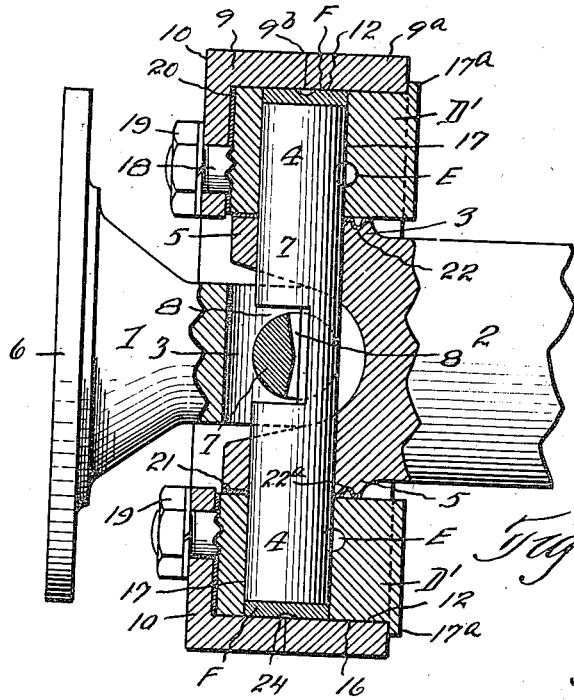
Figure 3:
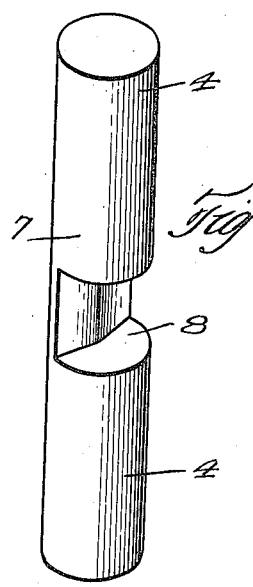

In the drawings, Fig. 1 represents a sectional elevation of a universal joint employing my invention; Fig. 2 is a similar view taken at right angles to Fig. 1; Fig. 3 a detail in perspective of one of the cross pins; Fig. 4 a central sectional view through the ring, showing the pins and trunnions in elevation; Fig. 5 is a side elevation of the ring, with a portion of the same broken away; Figs. 6 and 7 are sectional views corresponding respectively to the lines 6—6 and 7—7 of Fig. 5; Fig. 8 is a detail in sectional elevation, and Fig. 9 a detail in elevation, of one of the bearing blocks; Fig. 10 is a detail in perspective of one of the trunnions, with its thrust block; Figs. 11 and 12 are details in plan and section, respectively, of the washer surrounding the outer portion of each trunnion; Figs. 13 and 14 are views, similar to Figs. 1 and 2 respectively, of a modified form of my invention; Fig. 15 is a sectional elevation of a modification of my invention having a somewhat different type of bearing block; Fig. 16 is a detail in section of the ring employed with this form of my invention; and Fig. 17 is a detail in section corresponding to the line 17—17 of Figure 16.

Describing the various parts by reference characters and in connection with Figs. 1–12 inclusive, 1 and 2 denote hubs, connected respective'y with the driving and the driven shaft sections (not shown). The hubs are provided each with a yoke 3 each having diametrically opposed trunnions 4, there being an annular shoulder 5 at each end of the yoke surrounding the base of the trunnion thereof.

The hub is provided with a flange 6 by means of which it may be secured in any convenient manner to its cooperating shaft section. The trunnions 4 are formed as extensions of cross pins 7 each having a central recess 8 of slightly greater depth than the radius of such pin, each recess being about 210° in angular extent. The trunnions are adapted to be mounted in bearing blocks carried by and mounted within a connecting member in the form of a ring, the ring being indicated generally at A. The ring is preferably made from two symmetrical drop forgings each having a cylindrical outer wall 9, 9$^a$, respectively, a side wall 10, 10$^a$, respectively, and an inner segmental wall 11, 11$^a$, respectively. The ring segments are united by welding together the adjacent edges of the walls 9, 9$^a$, as indicated at 9$^b$, the ring thus formed having a central circumferential rib 9$^c$, including the weld. Formed in the ring thus provided are transversely extending seats B and B' for the bearing blocks. The seats B are arranged diametrically opposite each other, and the seats B' are also arranged diametrically opposite each other but are spaced each 90° from a seat B. The seats B extend through one of the side walls 10$^a$ toward but not including the other side wall 10 of the ring, and the block-receiving walls 12 thereof are each a section of a cylinder having a circumferential extent in excess of 180° whereby the seats prevent radial inward movement of the bearing blocks adapted to fit therewithin. The seats B' are constructed identically like the seats B, except that they extend inwardly from the opposite side of the ring, that is, through the side wall 10 toward but not including the side wall 10$^a$.

It will be noted that the space between the outer wall 9 and the inner segmental wall 11 is divided into a plurality of chambers C, these chambers being separated from each other by means of the side walls of the seats B, B' and the bearing blocks inserted within such seats. Each chamber C is adapted to communicate with the interior of the seats B, B' by means of ports 13 formed in the adjacent walls of the said seats. The chambers C are enabled to communicate with each other, and thus provide for the circulation of lubricant by centrifugal action, by means of ports or passages 14, connecting adjacent chambers and located adjacent to the inner face of the wall 9. For the purpose of supplying the chambers with lubricant, one of such chambers is provided with a filling plug 15.

Cooperating with the seats B, B' are the bearing blocks, which are indicated generally at D, D', the blocks D being fitted within the seats B and the blocks D' within the seats B'. Each block is of such shape in cross section as to enable it to fit snugly within its appropriate seat B or B', each being provided with an external wall 16 of the same shape as the wall 12, with the exception that the cylindrical bore 17 in each block is extended through the outer surface of such block.

Each of the blocks D, D', is provided with a flange 17ª which is adapted to engage the walls 10 and 10ª, respectively, and each block is also provided at its opposite end with a threaded stud 18 which is adapted to extend through an opening 10ᵇ in the wall 10 or 10ª, the blocks D, D' then being drawn to their seats by means of nuts 19 on such studs. Between the inner end of each block and the inner face of the wall 10 or 10ª is inserted a gasket 20 surrounding a stud 18.

The bearing blocks D' are identical with the bearing blocks D, being inserted in the ring in the opposite direction from the blocks D. The parts of the blocks D', being identical with the parts of the blocks D, are identified by the same numerals. Between each bearing block and the adjacent shoulder 5 and surrounding each trunnion is a washer 21 of spring metal, said washer normally having its outer edge 21ª in a different plane from its inner edge 21ᵇ and being provided with a projection 22 adapted to enter a seat 22ª in a shoulder. It will be evident that, when the parts are assembled, the inner and outer edges of each washer will be forced into approximately the same plane; but each washer, tending to assume its original shape, will tightly engage the bearing block with its outer edge and the shoulder with its inner edge, thereby assuring leak-tight joints between the trunnions, the bearing blocks and the shoulders, as well as serving to align the bearing blocks in their respective seats and to prevent rattling of the parts.

Each block is also provided with a through port E extending transversely thereof and cutting into one side of the cylindrical bore 17 thereof, the ports providing for the supply of lubricant from the chambers C and ports 13 to the trunnions. The ports E are so arranged that they are obstructed at their central portions by the trunnions, the latter cutting down the cross-sectional areas of the ports to about one-half, thereby insuring efficient lubrication of the intermediate portions of the trunnions.

It is intended to use separate thrust blocks between the ends of the trunnions 4 and the cooperating portion of the cylindrical wall 12 of each seat. Accordingly, the parts are so proportioned that, when assembled, the ends of the trunnions extend only to the points where the cylindrical bore 17 first intersects the outer cylindrical surface of a block D, D', the space between the end of each trunnion and the cylindrical wall 12 therebeyond being filled with such thrust block. These blocks are shown in detail in Figs. 1, 4 and 10. Each block F is substantially circular in plan view and is provided with a transverse groove 24 adapted to communicate on opposite sides of its center with the ports 14 and thus form therewith a channel between the adjacent chambers C, C' for the circulation of lubricant, as well as for the supply of lubricant to the thrust blocks and to the ends of the trunnions bearing thereagainst.

With the parts constructed and arranged as described, one of the hubs, with its trunnions and bearing blocks and thrust blocks applied to such trunnions can be readily applied to the ring by a lateral movement, inserting the bearing blocks into their appropriate seats, with the gaskets 20 and washers 21 in place, and then setting up the nuts 19 to draw the blocks to their seats. The opposite hub, with its trunnions and bearing blocks can be applied in like manner to the ring, inserting the bearing blocks into the seats which extend inwardly from the opposite side of the ring. The recessing of the cross pins at 8 enables them to be assembled with their bearing blocks, by movement of either hub toward the other and to be assembled with the axes of the trunnions in the same plane. The manner of forming the recesses accommodates the relative movements of the hubs and pins.

Figs. 13 and 14 show a modification of my invention. In this modification the parts are identical with those described in connection with Figs. 1-12 inclusive, with two exceptions. In the modified form of my invention, ordinary packing rings or gaskets 25 are substituted for the washers 21 and they are seated each in an annular recess 26 in each bearing block. Furthermore, the hub 2 has a yoke 4ª integral with the shoulders 5 and trunnions 4, the yoke being recessed or concaved at its center to accommodate the sleeve 2ª in which the cross-pin 7 of the hub member 1 is mounted. In all other respects, the joint shown in these views is identical with that set forth in connection with Figs. 1-12 inclusive.

In Figs. 15, 16 and 17, there is shown a modification of my invention in which the bearing blocks extend entirely through the ring A' and the trunnions are not provided with separate thrust blocks. In these views, the ring is indicated at A' and the chambers therein at C'. The seats for the bearing blocks are indicated at G and are substantially rectangular in section and extend entirely across the ring. The chambers C' communicate with the seats and the bearing blocks H by means of the ports 13'. The bearing blocks are rectangular in section to fit the seats G and are provided each with a cylindrical bore $27^a$ for the trunnions 4 and are also provided each with a recess $26^a$ having a packing washer $25^a$ similar to that shown in Figs. 13 and 14. Each bearing block is provided with a flanged head 27, between which and the adjacent side wall of the ring A there is inserted a gasket 28. The opposite end of the bearing block is substantially flush with the opposite end of the ring and is provided with a threaded stud 29. Surrounding the stud and engaging the adjacent face of the bearing block and adjacent part of the ring A', is a gasket 30. Surrounding the stud 29 and engaging the gasket is a heavy washer 31. The bearing blocks are drawn to their seats and are secured therein by nuts, indicated at 32, on the studs 29. Ports E, corresponding to the like designated ports shown in Figs. 1–3, are also provided.

Because of the shape of the bearing blocks and their cooperating seats, the blocks are capable of rocking in their seats while being retained by their seats against radial inward movement. This enables opposed blocks to be self-adjusting during the assembling operation, so as to align their bores. After such alignment the nuts upon the threaded ends of the bearing blocks may be set up to draw the blocks to their final positions in their respective seats.

The bearing blocks are thus not only self-aligning or adjusting during the assembling operation but, after such operation, they act as driving keys extending entirely across the connecting ring.

It will be evident that the parts of a joint constructed as described may be produced in an extremely convenient and economical manner; that the said parts may be conveniently assembled and disassembled; and that a lubricated joint can be produced from such an assembly which is capable of efficient and long-extended use.

Having thus described my invention, what I claim is:

1. In a universal joint, the combination, with a driving and a driven member and trunnions carried thereby, of a connecting member having seats extending inwardly from one side thereof for the trunnions of one of the first two members and seats extending inwardly from the opposite side thereof for the trunnions of the other of such members, bearing blocks adapted to receive said trunnions and to fit within the seats provided therefor, and means for securing the said blocks in said seats.

2. In a universal joint, the combination, with a driving and a driven member and trunnions carried thereby, of a connecting member having seats extending inwardly from one side thereof for the trunnions of one of the first two members and seats extending inwardly from the opposite sides thereof for the trunnions of the other of such members, and means for rotatably supporting the said trunnions in said seats.

3. In a universal joint, the combination, with a driven and a driving member each having a cross pin provided with trunnions, of a connecting member having transversely extending seats located within the peripheral portion thereof, and bearing blocks for said trunnions adapted to be inserted within said seats by movement of the said members toward each other, the central portion of at least one of said cross pins being recessed whereby the first two members may be assembled with the third member with the axes of the trunnions in substantially a common plane.

4. In a universal joint, the combination, with a driven and a driving member each having a cross pin provided with trunnions, of a connecting member having transversely extending seats, bearing blocks adapted to receive the said trunnions and to be inserted into said seats by a movement of the first two members toward each other, the central portions of said cross pins being recessed, whereby the parts may be assembled with the axes of the trunnions in substantially a common plane.

5. In a universal joint, the combination, with a driving and a driven member and trunnions carried thereby, of a connecting ring provided with pairs of seats extending laterally thereof from and including one of the sides thereof toward but not including the opposite side thereof, the pairs of seats extending from opposite sides of said ring, bearing blocks for said trunnions, and means for securing the said bearing blocks in their respective seats.

6. In a universal joint, the combination, with a driving and a driven member, each having trunnions, of a connecting ring, the said ring having opposed sides and provided with seats extending transversely from one of said sides thereof toward the other side, bearing blocks for said trunnions adapted to be fitted in said seats, the bearing blocks and their seats being so shaped that the blocks are retained by said seats against radial inward movement, and means for securing the said blocks in the said seats.

7. In a universal joint, the combination, with a driving and a driven member each having trunnions, of a connecting member provided with transversely extending seats, bearing blocks for said trunnions each having a projection at one end adapted to engage one side of the third member and having a reduced extension at its opposite end extending through the opposite side of the third member, and means engaging each extension for securing each of said blocks in place within its seat.

8. In a universal joint, the combination, with a driving and a driven member each having trunnions, of a connecting ring having transversely extending seats located within the peripheral portion thereof, bearing blocks adapted to receive said trunnions and each having a flange adapted to engage one of the sides of said ring and an extension adapted to project beyond the other side of said ring, a packing gasket surrounding such extension and adapted to engage such opposite side of said ring, and means engaging each extension for securing said blocks in their respective seats.

9. In a universal joint, the combination, with a driving and a driven member each having trunnions, of a connecting ring having seats for bearing blocks extending from one side thereof toward but not including the opposite side thereof, a bearing block for each trunnion, each bearing block adapted to be received within a seat and each having a flange at one end adapted to engage one of the sides of the ring and provided with a threaded stem extending through the opposite side of said ring, the inner end of the block and the inner portion of the seat having a gasket interposed therebetween surrounding said stem, and a nut on each stem for drawing each block to its seat.

10. In a universal joint, the combination, with a driving and a driven member each having trunnions, of a ring having lubricating chambers and bearing block seats interposed between said chambers with ports communicating with each chamber and with the outer portions of the adjacent bearing block seats, bearing blocks mounted in said seats and trunnions mounted in bores in said bearing blocks, the body of each bearing block having a through port communicating with the chambers on each side thereof, each of said through ports intersecting the bore of each bearing block and the trunnions in said blocks partially obstructing each such throughport, and a thrust block at the end of each trunnion, each thrust block being fitted within the outer portion of its cooperating seat and each having a groove adapted to register with the first mentioned ports.

11. In a universal joint, the combination, with a ring having lubricant chambers therein and provided with bearings intermediate said chambers, of universal joint members having trunnions mounted in said bearings, each bearing having a through port the ends whereof communicate with the chambers on each side thereof, the said through port cutting into one side of the trunnion bore in each bearing and being restricted in cross-sectional area by the trunnion in such bore.

12. In a universal joint, the combination, with a driving and a driven member each having trunnions, of a ring having lubricant chambers, with bearing blocks interposed between said chambers and having bores for said trunnions, the ring being provided with ports adapted to connect the said chambers and located beyond the ends of said trunnions, and a thrust block interposed between the end of each trunnion and the portion of the ring opposite thereto, each such block having a groove adapted to register with and complete the port extending beyond the outer end of its trunnion.

13. In a universal joint, the combination, with a driving and a driven member each having trunnions, of a ring having chambers for lubricant and bearing block seats interposed between said chambers, the said ring having ports communicating with said chambers and with the outer portion of each seat, a bearing block in each seat, a trunnion in each bearing block, and a thrust block interposed between the end of each trunnion and the outer portion of its seat, each thrust block having a groove adapted to register with the lubricant ports communicating with the outer portion of its seat.

14. In a universal joint, the combination, with a driving and a driven member, each having trunnions, of a connecting ring having seats, each having an outer cylindrical surface, bearing blocks having trunnion receiving bores mounted in said seats, and a thrust block interposed between the end of each trunnion and the cylindrical surface of the said seat.

15. In a universal joint, the combination, with a driving and a driven member, each having trunnions, of a connecting ring, having seats each having an outer cylindrical surface, bearing blocks having trunnion receiving bores and mounted in said seats, a thrust block interposed between the end of each trunnion and the adjacent cylindrical surface of the said seat, the said ring having lubricating chambers interposed between the bearings thereof and being provided with ports extending from said chambers and communicating with the outer cylindrical portions of the bearing block seats, and the thrust blocks each being provided with a groove adapted to communicate with such ports and providing for the flow of lubricant from one chamber to another beyond the ends of the trunnions.

16. A universal joint comprising a driving and a driven member each having trunnions, a connecting member comprising a pair of sections adapted to be welded together intermediate the sides of said member, each section having a pair of seats projecting thereinto from one side thereof and a pair of seats projecting thereinto from the opposite side thereof, the seats being adapted to register when the said sections are welded together, and bearing blocks for the trunnions adapted to be inserted into said seats.

17. A universal joint comprising a driving and a driven member each having trunnions, a ring comprising a pair of symmetrical sections adapted to be welded together in a plane coinciding substantially with the axes of the trunnions, when assembled therein, each ring section having a pair of seats projecting thereinto from one side thereof and a pair of seats projecting thereinto from the opposite side thereof, the seats being adapted to register when the said sections are welded together, and bearing blocks for the trunnions adapted to be inserted into said seats.

18. In a universal joint, the combination of a member having a trunnion and a shoulder from which said trunnion projects, a bearing member for said trunnion, and a washer surrounding the said trunnion and interposed between the bearing member and said shoulder, the said washer being of spring metal and normally having one edge thereof in a different plane from the other edge whereby, when assembled between the said shoulder and the said bearing member, one edge of such washer will be forced into engagement with the bearing member and the opposite edge into engagement with the shoulder.

19. In a universal joint, the combination of a member having a trunnion and a shoulder from which said trunnion projects, a bearing member for said trunnion, and a washer surrounding the said trunnion and interposed between the bearing member and said shoulder, the said washer being of spring metal and normally having one edge thereof in a different plane from the other edge whereby, when assembled between the said shoulder and the said bearing member, one edge of such washer will be forced into engagement with the bearing member and the opposite edge into engagement with the shoulder, the said washer having a projection intermediate the edges thereof adapted to engage a recess in the part of the joint adjacent thereto.

20. In a universal joint, the combination, with a driving and a driven member and trunnions carried thereby, of an annular connecting member having sides and inner and outer walls, the said connecting member having transversely extending seats therein, the said seats intersecting the inner wall of the connecting member and each seat having a cross section which is a segment of a circle in excess of 180°, and bearing blocks for said seats each having a cross section corresponding to that of its seat whereby the blocks are capable of rocking in their seats and are retained against radial inward movement, the said bearing blocks each having a radial bore for the reception of a trunnion.

21. In a universal joint, the combination, with a driving and a driven member and trunnions carried thereby, of an annular connecting member having sides and inner and outer walls, the said connecting member having transversely extending seats therein, each seat having a cross section which is a segment of a circle in excess of 180°, and bearing blocks for said seats each having a cross section corresponding to that of its seat whereby the blocks are capable of rocking in their seats, the said bearing blocks each having a radial bore for the reception of a trunnion.

22. In a universal joint, the combination, with a driving and a driven member and trunnions carried thereby, of an annular connecting member having sides and inner and outer walls, the said connecting member having transversely extending seats therein, the said seats being entirely within the outer wall of the said member and intersecting the inner wall and each seat having a cross section which is a segment of a circle in excess of 180°, bearing blocks for said seats each having a cross section corresponding to that of its seat whereby the blocks are capable of rocking in their seats and are retained against radial inward movement, the said bearing blocks each having a radial bore for the reception of a trunnion and the said connecting member being provided with lubricant chambers between said blocks and with means for supplying lubricant from said chambers to the said blocks and trunnions.

23. In a universal joint, the combination, with a driving and a driven member and trunnions carried thereby, of an annular connecting member having sides and inner and outer walls, the said connecting member having transversely extending seats therein, the said seats being entirely within the outer wall of the said member and each having a cross section which is a segment of a circle in excess of 180°, and bearing blocks for said seats each having a cross section corresponding to that of its seat whereby the blocks are capable of rocking in their seats, the said bearing blocks each having a radial bore for the reception of a trunnion, the said connecting member being provided with a lubricant chamber and with means for supplying lubricant from said chamber to the said blocks and trunnions.

24. In a universal joint, the combination, with a driving and a driven member each having trunnions, of an annular connecting member having transversely extending seats located entirely within the outer wall of said member and intersecting the inner wall thereof, each seat having a cross section which is the segment of a circle in excess of 180°, bearing blocks for said trunnions each having a contour adapting it to fit and rock within a seat and each having a projection at one end adapted to engage one side of the connecting member and a reduced extension at its opposite end extending through the opposite side of such member, and means engaging each extension for securing each of said blocks in place within its seat, the said connecting member having means for supplying lubricant to the said blocks and trunnions.

25. In a universal joint, the combination, with a driving and a driven member each having trunnions, of an annular connecting member having transversely extending seats intersecting the inner wall thereof, each seat having a cross section which is the segment of a circle in excess of 180°, bearing blocks for said trunnions each having a contour adapting it to fit and rock within a seat and each having a projection at one end adapted to engage one side of the connecting member and a reduced extension at its opposite end extending through the opposite side of such member, and means engaging each extension for securing each of said blocks in place within its seat.

26. In a universal joint, the combination, with a driving and a driven member and trunnions carried thereby, of a connecting ring having seats extending transversely thereof from and through one side of said ring toward and in proximity to the opposite side thereof, and bearing blocks adapted to be inserted in said seats through a side of the ring, the blocks and seats being of such shape as to permit a rocking movement of each block in its seat, each block having a radial bore for the reception of a trunnion, and means for securing the said blocks in the said seats.

27. In a universal joint, the combination, with a driving and a driven member and trunnions carried thereby, of a hollow lubricant-containing connecting ring, the said ring having seats extending transversely thereof from and through one side of said ring toward and in proximity to the opposite side thereof, bearing blocks adapted to be inserted into said seats through a side of the ring, each block having a radial bore for a trunnion and the blocks and seats being so shaped that the blocks may rock in said seats, means for securing the said blocks in their respective seats in said ring, and means for supplying lubricant from the ring to the said blocks and trunnions.

28. In a universal joint, the combination, with a driving and a driven member and trunnions carried thereby, of a hollow lubricant-containing connecting ring, the said ring having seats extending transversely thereof from and through one side of said ring toward and in proximity to the opposite side thereof and each seat intersecting the inner wall of said ring, bearing blocks adapted to be inserted into said seats through a side wall of the ring, the blocks and seats being so shaped that the blocks may rock in said seats and each block having a radial bore for the reception of a trunnion and adapted to register with the opening provided by the intersection of its seat with the inner wall of the ring, means for securing the said blocks in their respective seats in said ring, and means for supplying lubricant from the ring to the said blocks and trunnions.

29. In a universal joint, the combination, with a driving and a driven member each having trunnions, there being a shoulder surrounding the inner portion of each trunnion, of a hollow lubricant-containing connecting ring having seats for the trunnions, and a washer on each trunnion and interposed between the shoulder and the seat therefor, the said washer being of spring metal and normally having one edge thereof in a different plane from the other edge whereby when assembled between a shoulder and a seat, one edge of such washer will be forced into engagement with the shoulder and the opposite edge into engagement with the seat.

In testimony whereof, I hereunto affix my signature.

FREDERICK W. PETERS.